United States Patent
Huang-Tsai

(10) Patent No.: US 8,002,299 B2
(45) Date of Patent: Aug. 23, 2011

(54) SIDE FOOT BOARD FOR A VEHICLE

(76) Inventor: Li-Yue Huang-Tsai, Tainan (TW)

( * ) Notice: Subject to any disclaimer, the term of this patent is extended or adjusted under 35 U.S.C. 154(b) by 273 days.

(21) Appl. No.: 12/414,668

(22) Filed: Mar. 31, 2009

(65) Prior Publication Data

US 2010/0244397 A1    Sep. 30, 2010

(51) Int. Cl.
*B60R 3/00* (2006.01)
(52) U.S. Cl. ............ 280/169; 280/163; 280/164.1
(58) Field of Classification Search ........... 280/163, 280/164.1, 169
See application file for complete search history.

(56) References Cited

U.S. PATENT DOCUMENTS

| | | | | |
|---|---|---|---|---|
| 6,588,782 | B2 * | 7/2003 | Coomber et al. | 280/163 |
| 7,677,583 | B2 * | 3/2010 | Armstrong et al. | 280/163 |
| 7,722,067 | B2 * | 5/2010 | Stoops | 280/169 |
| 2003/0178805 | A1 * | 9/2003 | Elrod | 280/163 |
| 2004/0150183 | A1 * | 8/2004 | Clermont et al. | 280/163 |
| 2005/0087950 | A1 * | 4/2005 | Draper et al. | 280/163 |
| 2006/0001229 | A1 * | 1/2006 | Kayne | 280/163 |
| 2006/0119065 | A1 * | 6/2006 | Lanoue et al. | 280/163 |
| 2006/0249924 | A1 * | 11/2006 | Armstrong et al. | 280/163 |
| 2007/0075519 | A1 * | 4/2007 | Stoops | 280/163 |
| 2007/0138757 | A1 * | 6/2007 | Kuntze et al. | 280/163 |
| 2007/0267841 | A1 * | 11/2007 | Mulder | 280/163 |
| 2007/0296175 | A1 * | 12/2007 | Flajnik et al. | 280/169 |
| 2008/0018074 | A1 * | 1/2008 | Steffens et al. | 280/163 |
| 2008/0258421 | A1 * | 10/2008 | Crandall | 280/163 |
| 2009/0121449 | A1 * | 5/2009 | Kuntze et al. | 280/163 |
| 2009/0224505 | A1 * | 9/2009 | Peterson et al. | 280/164.1 |
| 2009/0267374 | A1 * | 10/2009 | Mulder | 296/37.1 |
| 2010/0244397 | A1 * | 9/2010 | Huang-Tsai | 280/163 |

* cited by examiner

*Primary Examiner* — Ruth Ilan
*Assistant Examiner* — Karen A Beck

(57) ABSTRACT

A side foot board for a vehicle includes a plastic foot board formed thereon with a holding surface provided with at least one stepping member with plural grooves, and the plastic foot board has its underside disposed with a recessed surface. A decorative board mounted on the holding surface of the plastic foot board is provided with a stepping member at a location matching with the stepping member of the plastic foot board, the stepping member has plural grooves, and the decorative board further has its underside formed with projections at locations corresponding with the grooves of the stepping member of its own and fitting with the grooves of the stepping member of the plastic foot board. A rubber anti-skid board is fixed on the stepping member of the decorative board, and a support frame is secured on the recessed surface at the underside of the plastic foot board.

2 Claims, 4 Drawing Sheets

SIDE FOOT BOARD FOR A VEHICLE

BACKGROUND OF THE INVENTION

1. Field of the Invention

This invention relates to a side foot board for a vehicle, particularly to one able to increase integral strength and elevate integral beauty, having excellent effect in slip prevention and able to be assembled easily and quickly.

2. Description of the Prior Art

Generally, since a sport utility vehicle (SUV) or a van is comparatively high, it is inconvenient for people to get on or get off, especially for children, old and crippled people or women wearing skirts. To solve such a problem, the sport utility vehicle or the van has opposite sides respectively installed with a side foot board for facilitating people to get on or get off the vehicle. A conventional vehicle side foot board 5, as shown in FIG. 1, is made of metallic material and formed with lots of projecting streaks on the surface.

However, the conventional vehicle side foot boards 5 made of metal only have their surfaces provided with projecting streaks for preventing slipping, hardly possible to effectively produce frictional force with the sole of a shoe. Therefore, the conventional metallic side foot board 5 cannot very effectively prevent slipping, likely to result in slipping and falling during rainy days.

SUMMARY OF THE INVENTION

The objective of this invention is to offer a side foot board for a vehicle, able to increase integral strength and elevate integral beauty, having excellent slip-preventing effect and able to be assembled easily and quickly.

The side foot board for a vehicle in the present invention includes a plastic foot board formed with a holding surface provided thereon with at least one stepping member with plural grooves, and the plastic foot board has its underside disposed with a recessed surface. A decorative board is assembled on the holding surface of the plastic foot board and provided with a stepping member with plural grooves at a location tallying with the stepping member of the plastic foot board, and the decorative board has its underside formed with plural projections at locations corresponding with the grooves to be respectively fixed and positioned in the grooves of the stepping member of the plastic foot board. A rubber anti-skid board is mounted on the stepping member of the decorative board, and a support frame is secured on the recessed surface at the underside of the plastic foot board.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
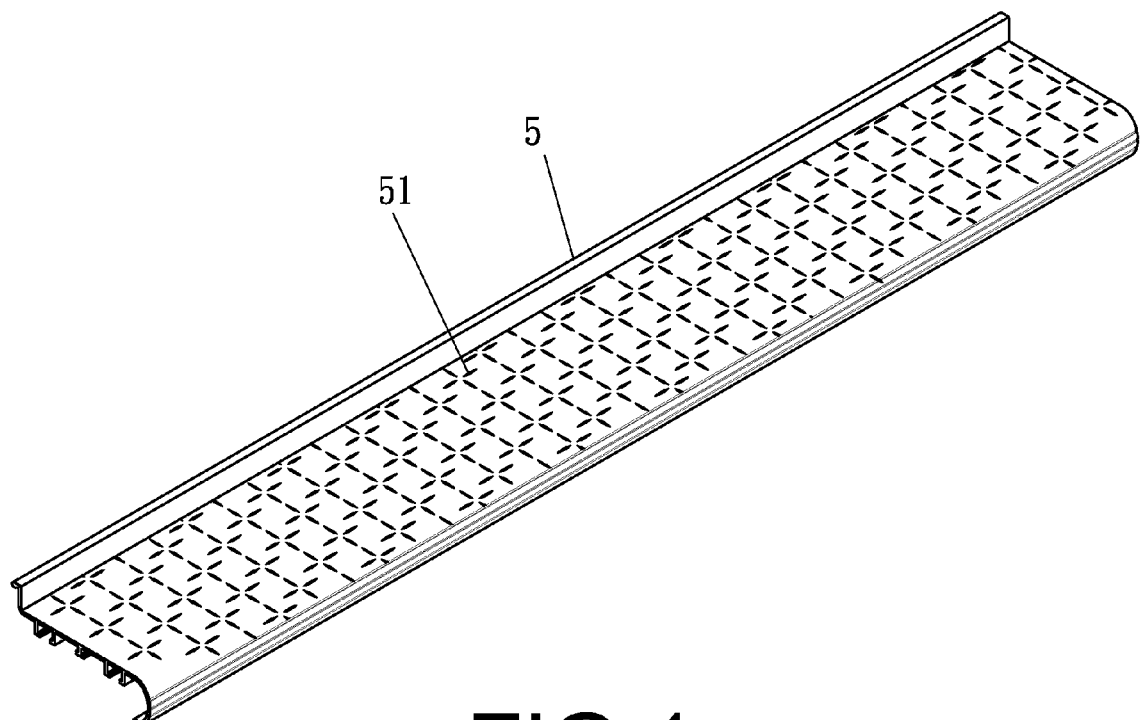
FIG. 1 is a perspective view of a conventional vehicle side foot board.
Figure 2:
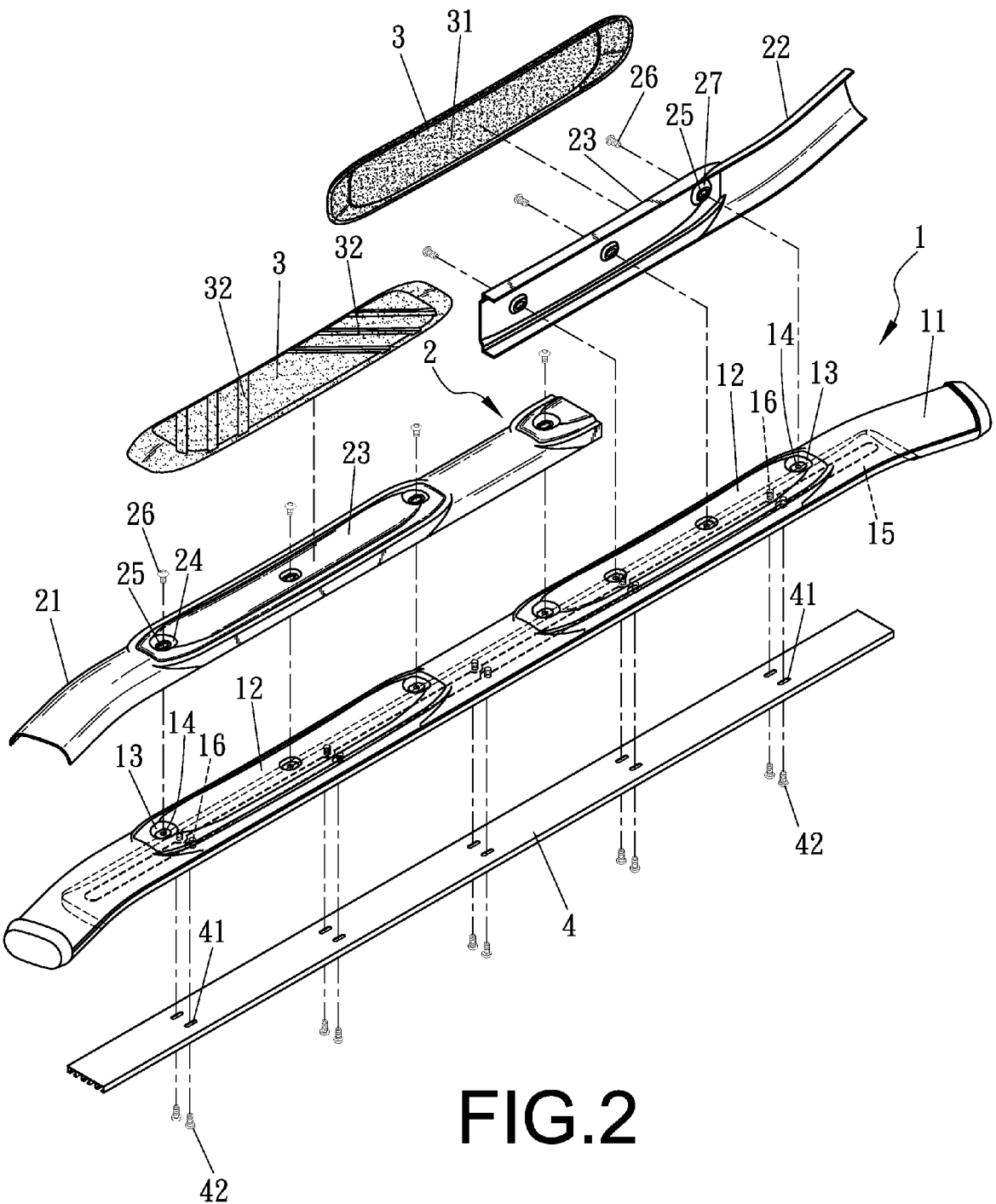
FIG. 2 is an exploded perspective view of a side foot board for a vehicle in the present invention.

A preferred embodiment of a side foot board for a vehicle in the present invention, as shown in FIG. 2, includes a plastic foot board 1, a decorative board 2, a rubber anti-skid board 3 and a support frame 4 as main components combined together.

The plastic foot board 1 is formed with a holding surface 11 provided thereon with at least one stepping member 12 with plural grooves 13 respectively formed with a threaded hole 14 in the interior. Further, the plastic foot board 1 has its underside disposed with a recessed surface 15 with plural threaded holes 16.

The decorative board 2 is mounted on the holding surface 11 of the plastic foot board 1, consisting of a long decorative board 21 and short decorative board 22 connected together. The long decorative board 21 and the short decorative board 22 are respectively provided thereon with a stepping member 23 at a location matching with the stepping member 12 of the plastic foot board 1. Each stepping member 23 is formed with a plurality of grooves 24 respectively formed with an insert hole 25 for a screw 26 to be inserted therethrough. The decorative board 2 further has its underside formed with a plurality of projections 27 at locations respectively corresponding with the grooves 24.

The rubber anti-skid board 3 set on the stepping member 23 of the decorative board 2 has its underside provided with adhesive 31, preferably a double-sided adhesive, having its topside cut with a plurality of anti-skid recesses 32.

The support frame 4 is secured on the recessed surface 15 at the underside of the plastic foot board 1 and bored with a plurality of through holes 41 for screws 42 to be respectively inserted therein.

Figure 3:
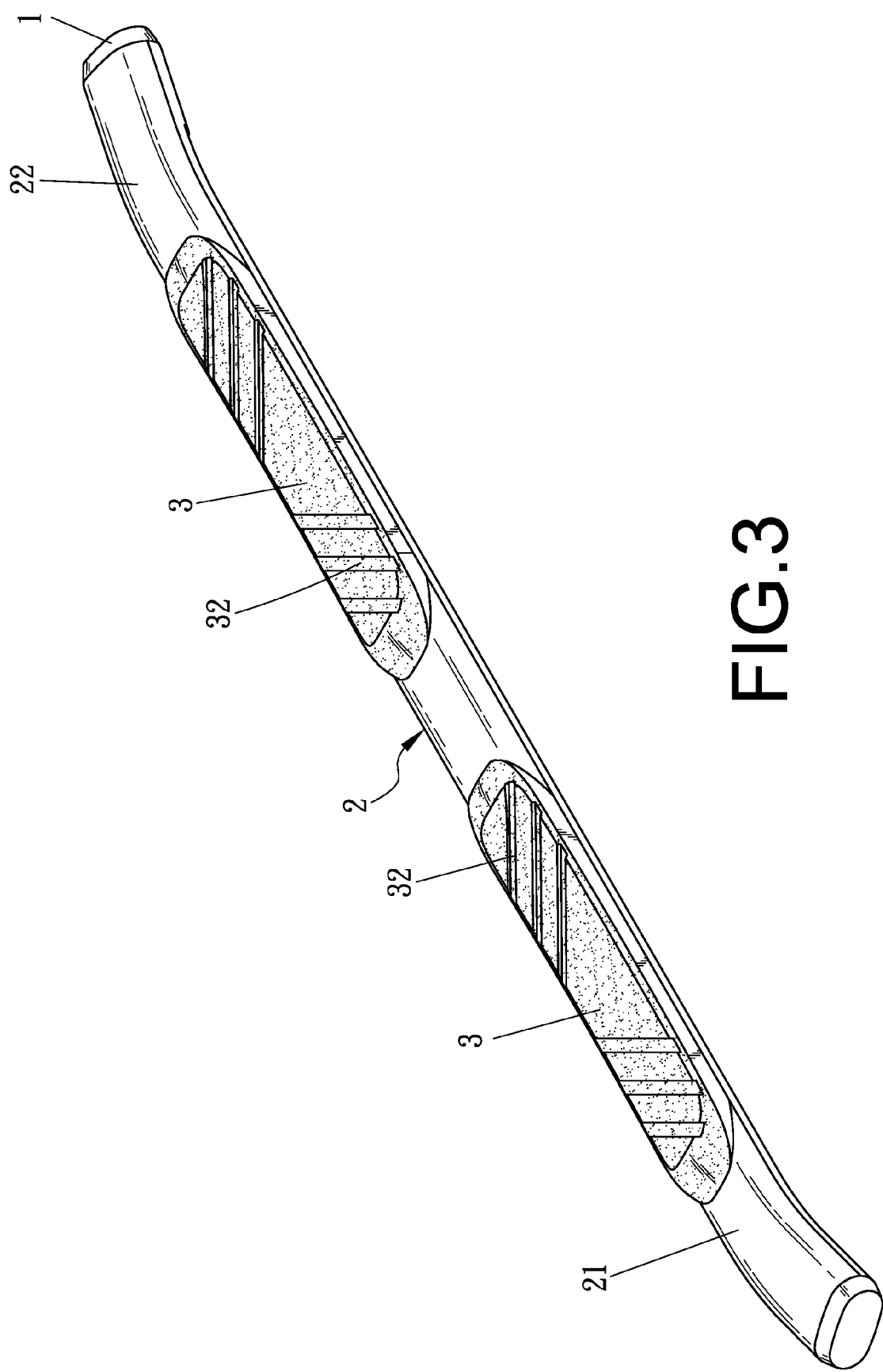
FIG. 3 is a perspective view of the side foot board for a vehicle in the present invention.
Figure 4:
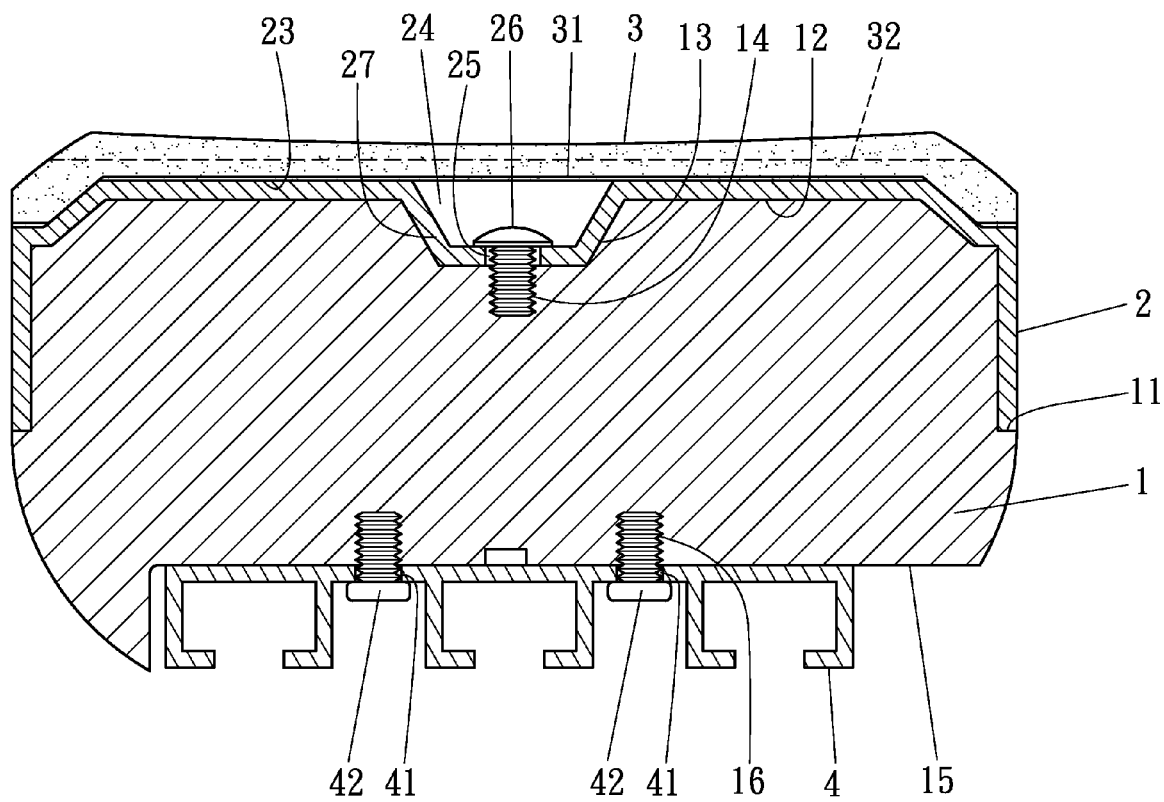
FIG. 4 is a cross-sectional view of the side foot board for a vehicle in the present invention.

In assembling, referring to FIGS. 3 and 4, firstly, the long decorative board 21 and the short decorative board 22 are connected together and assembled on the holding surface 11 of the plastic foot board 1 to form an integral decorative board 2, while the projections 27 on the underside of the long and the short decorative board 21, 22 are respectively engaged with the recessed slots 13 of the stepping member 12 of the plastic foot board 1 and firmly positioned therein. Then, the screws 26 are respectively inserted through the insert holes 25 of the long and the short decorative board 21, 22 and screwed in the threaded holes 14 of the plastic foot board 1 to fix the decorative board 2 tightly on the holding surface 11 of the plastic foot board 1. Next, the rubber anti-skid board 3 is mounted on the stepping member 23 of the decorative board 2 to have an adhesive 31 at the inner side of the rubber anti-skid board 3 firmly stuck to the stepping member 23 of decorative board 2. Lastly, the support frame 4 is fixed with the plastic foot board 1 by means of screws 42 respectively inserted through the through holes 41 of the support frame 4 and firmly screwed with the threaded holes 16 of the plastic foot board 1 to finish assembling the side foot board.

After the side foot board is assembled at the opposite sides of a vehicle, the rubber anti-skid board 3 can effectively prevent slipping and produce enough frictional force with the sole of a shoe, able to achieve excellent effect of slip prevention, The support frame 4 can increase the integral strength of the plastic foot board 1, and the decorative board 2 can beautify wholly the side foot board. In addition, the vehicle side foot board of this invention can be assembled easily and quickly.

While the preferred embodiment of the invention has been described above, it will be recognized and understood that various modifications may be made therein and the appended claims are intended to cover all such modifications that may fall within the spirit and scope of the invention.

What is claimed is:

1. A side foot board for a vehicle comprising:

a plastic foot board (1) formed with a holding surface (11) provided thereon with at least one stepping member (12) with plural grooves (13); each groove (13) of the holding surface (11) being formed with a threaded hole (14) in an interior thereof; an underside of the plastic foot board (1) being formed with a recessed surface (15) with plural threaded holes (16);

a decorative board (2) mounted on the holding surface (11) of the plastic foot board (1), consisting of a long decorative board (21) and short decorative board (22) connected together; each of the long decorative board (21) and the short decorative board (22) being respectively provided with a stepping member (23) at a location matching with the stepping member (12) of the plastic foot board (1): each stepping member (23) of the decorating board (2) being formed with a plurality of grooves (24); each groove (24) of the decorating board (2) being formed with an insert hole (25) for a screw (26) to be inserted therethrough; an underside of the decorative board (2) being formed with a plurality of projections (27) at locations respectively corresponding with the grooves (24) of the stepping member (23) of the decorating board (2);

two rubber anti-skid boards (3) set on the long decorative board (21) and the short decorative board (22) respectively of the stepping member (23); an underside of each of the rubber anti-skid board (3) being provided with adhesive (31), and on top of each of the rubber anti-skid board (3) being formed with a plurality of anti-skid recesses (32); and only a support frame (4) secured on the recessed surface (15) at the underside of the plastic foot board (1) and bored with a plurality of through holes (41) for screws (42) to he respectively inserted therein; the support frame (4) having a rectangular upper side and a lower side of the support frame is extended with a plurality of "L" shape sheets from the upper side thereof;

wherein in assembling, the long decorative board (21) and the short decorative board (22) are connected together and assembled on the holding surface (11) of the plastic foot board 1 to form an integral decorative board (2); while the projections (27) on the underside of the long and the short decorative board (21, 22) are respectively engaged with the recessed slots (13) of the stepping member (12) of the plastic foot board (1) and firmly positioned therein; then, the screws (26) are respectively inserted through the insert holes (25) of the long and the short decorative board (21, 22) and screwed in the threaded holes (14) of the plastic foot board 1 to fix the decorative board (2) tightly on the holding surface (11) of the plastic foot board (1); then the rubber anti-skid board (3) is mounted on the stepping member (23) of the decorative board (2) to have the adhesive (31) at the inner side of the rubber anti-skid board (3) firmly stuck to the stepping member (23) of decorative board (2); lastly, the support frame (4) is fixed with the plastic foot board (1) by means of screws (42) respectively inserted through the through holes (41) of the support frame (4) and firmly screwed with the threaded holes (16) of the plastic foot board (1) to finish assembling the side foot board.

2. The side foot board for a vehicle as claimed in claim 1, wherein said rubber anti-skid board has underside provided with a double sided adhesive.

* * * * *